United States Patent [19]
Erland

[11] Patent Number: 5,463,794
[45] Date of Patent: Nov. 7, 1995

[54] FIBER REINFORCED PLASTIC (FRP) COMPOSITE HINGE

[76] Inventor: Robert K. Erland, P.O. Box 575, Punta Gorda, Fla. 33951

[21] Appl. No.: 181,583

[22] Filed: Jan. 14, 1994

Related U.S. Application Data

[62] Division of Ser. No. 972,294, Nov. 5, 1992, Pat. No. 5,318,422.

[51] Int. Cl.$^6$ ........................................................ E05D 1/00
[52] U.S. Cl. ................................................ 16/225; 16/385
[58] Field of Search ............................ 16/225, 385, 372, 16/DIG. 13

[56] References Cited

U.S. PATENT DOCUMENTS

| | | |
|---|---|---|
| 1,172,543 | 2/1916 | Mastin . |
| 1,184,469 | 5/1916 | Mastin . |
| 2,160,221 | 5/1939 | Masters et al. . |
| 2,201,968 | 5/1940 | Fischer ........................................ 16/372 |
| 2,487,494 | 11/1949 | Taber . |
| 2,594,838 | 4/1952 | Alexander et al. . |
| 3,019,486 | 2/1962 | Stinson . |
| 3,222,437 | 12/1965 | Schilling . |
| 3,445,052 | 5/1969 | Lewallen . |
| 3,767,752 | 10/1973 | Karlyn et al. . |
| 4,656,814 | 4/1987 | Lockington . |
| 4,670,318 | 6/1987 | Uchiya et al. . |
| 4,729,860 | 3/1988 | Leach . |
| 4,809,402 | 3/1989 | Rainville ................................... 16/385 |
| 5,350,614 | 9/1994 | Chase et al. ................................ 428/53 |

FOREIGN PATENT DOCUMENTS

| | | |
|---|---|---|
| 611912 | 1/1961 | Canada . |
| 0031269 | 3/1977 | Japan ................................. 16/DIG. 13 |
| 1007683 | 10/1965 | United Kingdom ..................... 16/225 |

Primary Examiner—Mark Rosenbaum
Assistant Examiner—Chuck Y. Mah
Attorney, Agent, or Firm—Leydig, Voit & Mayer

[57] ABSTRACT

Molded fiber reinforced plastic (FRP) composite hinges and a method of making integral fiber hinges molded-in an FRP composite. After a mold surface has been prepared, a layer of fabric is placed against the mold surface, the fabric is impregnated with resin, and a hinge assembly is placed against the resin-impregnated fabric. The hinge assembly includes juxtaposed narrow strips of reinforcing fabric and fiber hinge fabric. The hinge fabric is composed of flexible fibers which are of high tensile strength and capable of repeated flexing without substantial fatigue (e.g. aramid fibers), and which form flexible elements along a desired hinge line in the molded composite. The hinge assembly also has an elongated wire between a strip of hinge fabric and an adjacent strip of reinforcing fabric, the wire being coextensive with the desired hinge line, and the fibers of the fiber hinge fabric extending across the desired hinge line. The hinge assembly fabric is impregnated with resin, and the resin is caused to set, after the resin is set, the molded composite is removed from the mold. Fibers and resin are then removed from between the wire and the inner surface of the molded composite by cutting from the inner surface through the strips of reinforcing fabric to the wire, forming a slot. The wire is removed from the slot leaving a groove in the molded composite along the hinge line. The molded composite is then cut along a boundary intersecting the hinge line at spaced parts to provide a movable section hinged relative to a fixed section of the molded composite along the hinge line by fiber elements of the fiber hinge fabric which extends across the hinge line. Integral hinges and pre-formed hinges are made with this method.

5 Claims, 4 Drawing Sheets

FIBER REINFORCED PLASTIC (FRP) COMPOSITE HINGE

This application is a divisional of application Ser. No. 07/972,294, filed Nov. 5, 1992, now U.S. Pat. No. 5,318, 422.

TECHNICAL FIELD

This invention relates to molded fiber reinforced plastic (FRP) composites and, more particularly, to a method of making an integral fiber hinge molded in such a composite.

BACKGROUND OF THE INVENTION

In fiber reinforced plastic products of many kinds, for example, airplane skin, automobile bodies, container walls, boat hulls, etc., it is frequently desired to hinge a first movable section to a second fixed section of the product. As one specific illustration, in an airplane wing the aileron is hinged to the main section of the wing. The common practice is to secure one or more preconstructed plastic or metal hinges to the adjoining edges of the two sections which are hinged. The two sections individually may be made as one part and then cut into the sections along the edge where the hinge is later secured. The hinge may be a continuous hinge or may be a series of individual hinges secured to the adjoining edges of the sections by fasteners such as rivets or adhesive, depending on the application and the mechanical specifications of the hinged joint.

Integral hinges are known, for example, molded polypropylene hinge structures have been molded as an integral member in the manufacture of an integral member in the manufacture of polypropylene sheet articles, as disclosed in U.S. Pat. No. 3,222,437.

Molded fiber reinforced plastic (FRP) composites are typically made by applying layers of fibrous reinforcing material against the prepared surface of a mold and impregnating the layers of material with a selected liquid resin to form a laminate which after the resin hardens has the shape of the mold. It is advantageous for environmental and other reasons to use a bag molding procedure in which after the layers of resin impregnated fibrous material have been laid-up against the mold surface, a sheet of rubber or synthetic fabric is applied over the layers and sealed at its edges to the mold in such a way as to form an air-tight bag. Air and the gaseous products produced as the resin hardens are withdrawn from the bag which is caused to be pressed against the resin impregnated fibrous layers by atmospheric pressure while the resin hardens which compresses the laminate. The gaseous products may be passed through a filter to extract environmental harmful components before being discharged to the atmosphere, thereby protecting the environment.

DISCLOSURE OF THE INVENTION

The present invention will be explained by describing a preferred embodiment wherein a fiber hinge is formed as an integral or molded-in element of a molded fiber reinforced plastic (FRP) composite to join sections of the molded composite.

A mold is first constructed having a finished inside surface of a shape which will provide the exterior of a product component. While in most applications the mold inside surface is curved, in some applications it will be flat so that the molded composite is flat or has flat portions.

The first step in the preparation of the molded composite involves applying a release agent such as wax to the inside surface of the mold so that the molded composite will be released by the mold and removed without damaging the mold.

A further step in the preparation of the molded composite involves spraying a layer of substantially uniform thickness of a resin which provides the desired smooth exterior surface on the molded composite, this surface coating being preferably a flexible lacquer or flexible paint, and the coating may be colored to provide not only a smooth finish but also a desired color.

To construct a fiber hinge as a molded-in element of the molded composite, after the mold surface has been prepared and the surface resin coating has been applied as by spraying to the surface of the mold, the method of this invention involves:

placing a fabric of fibers against the resin-coated mold surface;

impregnating the fabric with resin;

preparing a hinge assembly comprising:
juxtaposed narrow strips of fabric including (1) at least one strip of fiber hinge fabric comprised of flexible fibers which are of high tensile strength and capable of repeated flexings without substantial fatigue (preferably Kevlar aramid fibers), and which form flexible elements along a desired hinge line in the molded composite, and (2) at least one strip of reinforcing fiber fabric comprised of fibers (preferably glass fibers) which form reinforcing elements of the FRP composite sections adjacent the desired hinge line in the molded composite;

an elongated wire placed between a strip of fiber hinge fabric and an adjacent strip of reinforcing fiber fabric, the wire being coextensive with the desired hinge line in the molded composite, and the wire and the strip of fiber hinge fabric being relatively arranged so that fibers of the fiber hinge fabric extend across the desired hinge line which may be achieved by arranging the hinge fabric such that it is oriented on a bias relative to the wire, and stitches or like fasteners in rows parallel to the wire securing the superposed fabric strips of the hinge assembly together;

placing the hinge assembly against the resin-impregnated fabric laid against the mold surface with the wire in the hinge assembly coinciding with the desired hinge line in the molded composite; and impregnating the juxtaposed fabric strips of the hinge assembly with resin; and causing the resin to set in the multiple layer composite laid against the mold surface including the hinge assembly, such that the molded composite is ready for removal from the mold.

In its simplest form, the molded-in hinge may be joined to the impregnated fabric laid against the mold surface without additional layers of reinforcing fabric. To provide a stronger, more rigid structure, however, it is preferred to apply one or more additional layers of reinforcing fiber fabric over the hinge assembly and the impregnated fabric laid against the mold surface and to impregnate with resin the additional layer or layers. Preferably the additional layers overlap boundaries of the hinge assembly and integrate the hinge assembly into a multiple layer composite laid against the mold surface, however, it is recognized that a hinge may be formed with this method dividing two sections of fabric and provided for subsequent incorporation into a composite to form an element thereof. In such an arrangement the additional layer or layers may not overlap boundaries of the assembly, and may be essentially coextensive therewith.

According to this invention, with the multiple layer composite laying in the mold and exposed to the atmosphere the resin may be allowed to set. Alternatively, a bag molding procedure may be utilized to apply pressure against the multiple layer composite laid against the mold surface including the impregnated fabric, resin impregnated hinge assembly and resin impregnated reinforcing fiber layers, while the resin hardens. One advantage of applying pressure against the hinge assembly is to squeeze resin from the hinge fabric by the pressure transmitted by the wire, thereby causing the fibers of the hinge fabric which act as hinge elements to become free of attached resin more easily and with less working to fracture the resin and free the fibers. This procedure has the further advantage that gaseous products released while the resin sets up will be captured and not released to the atmosphere. When a bag molding procedure is utilized further steps in the preparation of the molded composite with a molded-in fiber hinge are as follows:

before the resin is set and while the resin initially hardens, applying sufficient pressure in a desired hinge line so as to cause the embedded wire to squeeze resin laterally from fiber interstices of outer layers of the multiple layer composite, in particular the fiber hinge fabric, which are located between the wire and the mold surface and thereby reduce the amount of resin remaining in the fiber hinge fabric in a plane normal to the mold surface and intersecting the wire;

causing the resin in the multiple layer composite including the hinge assembly to set providing a molded composite formed to the shape of the mold surface which is then ready for removal from the mold.

When a bag molding procedure is utilized the bag is then removed and the molded composite lifted from the mold. After the molded composite has been removed from the mold, the molded composite has a finished exterior surface matching the surface characteristics of the mold and an unfinished inner or back surface.

To complete the preparation of the molded-in hinge these steps are performed:

removing fibers and resin from between the wire and the inner surface of the molded composite by cutting through the inner surface to the wire with a powered cutting or grinding tool or a hand file to form a slot co-extensive with the wire;

removing the wire from the molded composite through the slot, leaving a groove in the molded composite along the desired hinge line;

cutting the molded composite along a boundary intersecting the hinge line at spaced points to provide a movable section hinged relative to a fixed section of the molded composite along the hinge line by fiber elements of the fiber hinge fabric which extend across the hinge line.

BEST MODE FOR CARRYING OUT THE INVENTION

Several embodiments of the present invention will be explained as it has been applied in (1) the making of molded-in hinges in molded FRP composites forming components of an aircraft, (2) the preparation of pre-formed hinges which may be incorporated in various products in place of conventional hinges.

In the first embodiment, the aircraft components are formed of layers of fabric saturated with epoxy resin. Throughout the full molded FRP composite, at least two fabric layers are included, one outside layer of aramid fiber fabric or cloth (Kevlar) and an inside layer of fiberglass fabric or cloth. In areas of the composite which may be subject to high air loads or high mechanical loads, such as a step area on a wing panel, or an area to support exterior wing tanks or other devices, more than two layers of fabric are included. The basic structure of the molded FRP composite, however, can be considered as comprising at least two fabric layers of Kevlar and fiberglass fabric or cloth impregnated with epoxy resin and an exterior finish provided by a flexible coating such as lacquer or paint.

Figure 1:
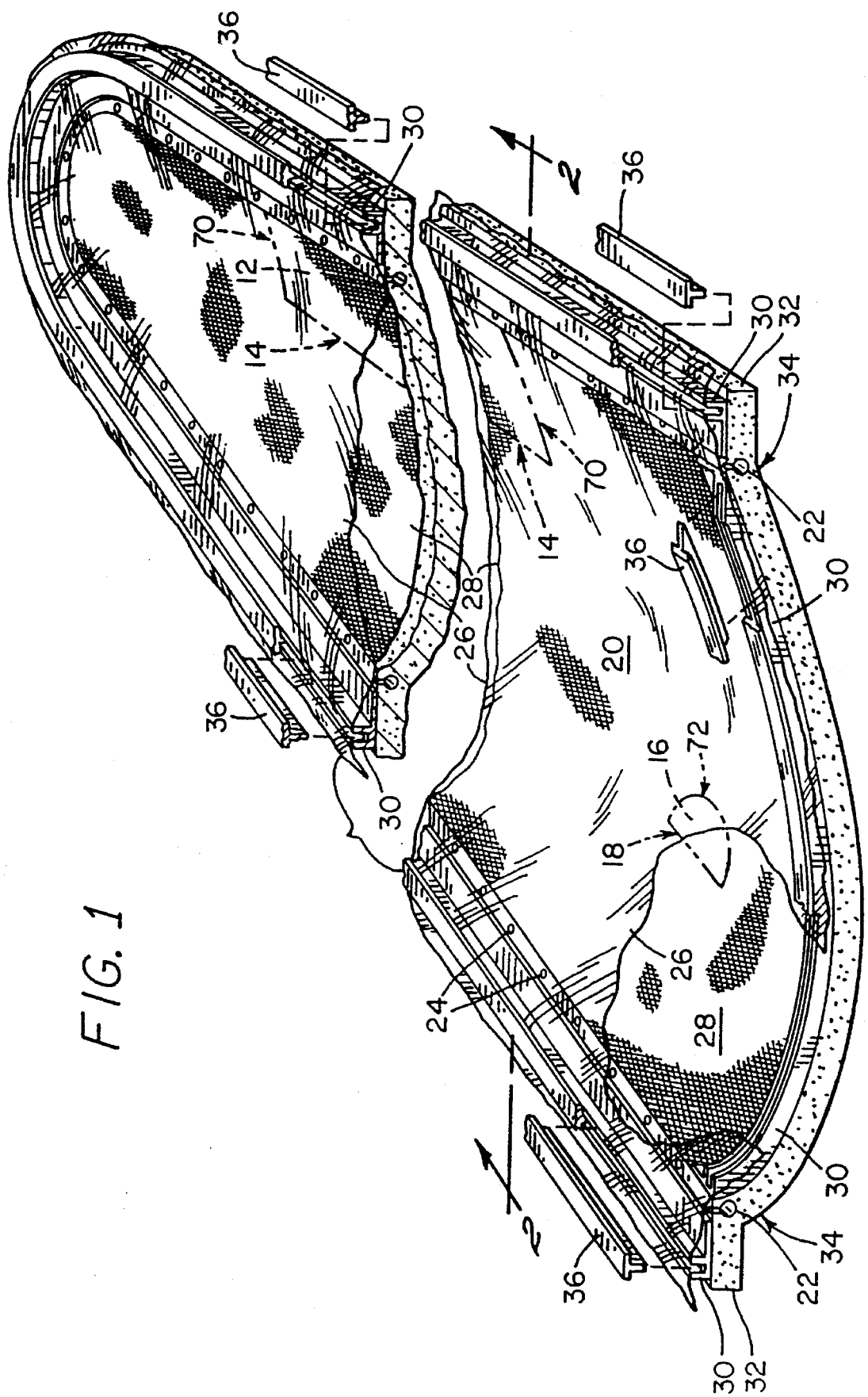
FIG. 1 is a diagrammatic perspective view of an improved vacuum mold for an aircraft wing section and having a device for securing a flexible sheet to form a bag to be evacuated in a bag molding procedure.

According to another aspect of the present invention, the molded FRP composite is formed in a mold using a vacuum bag molding procedure. To make it possible to fasten the bag in place on the mold, according to this aspect of the invention, the mold is constructed with an improved securing device for the bag material. Referring to FIG. 1, this figure illustrates a mold 10 for molding a top section of the wing of an aircraft. In the trailing edge of the wing an aileron 12 (shown in phantom) will be hinged using a molded-in hinge constructed according to this invention along a desired hinge line 14. A gas tank cover 16 (also shown in phantom) will be hinged using a molded-in hinge of this invention along a desired hinge line 18.

Figure 2:
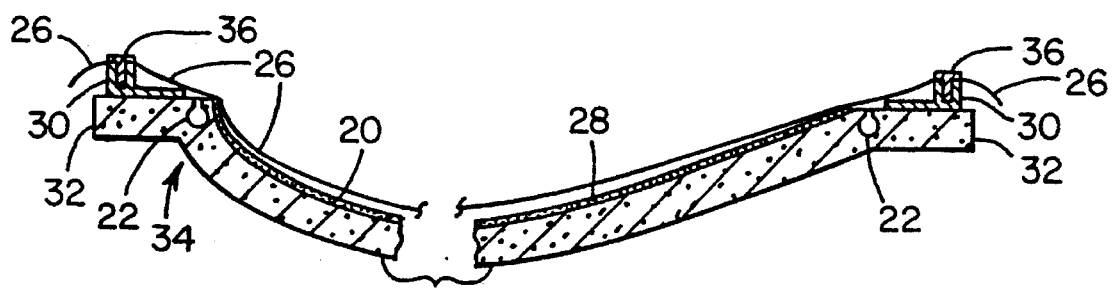
FIG. 2 is a diagrammatic cross-sectional view of the mold taken substantially in the plane of lines 2—2 of FIG. 1 and illustrates the flexible sheet secured at its periphery by the improved securing device of this invention.

The mold 10 is made with an inside surface 20 having the contour of the top section of the wing, such a wing being made by separately molding a top section in the mold 10 and a bottom section in another mold (not shown) which are then assembled with reinforcing members and control cables and other conventional parts to make the complete wing. FIG. 1 illustrates a mold 10 typically constructed of resin impregnated layers of fiberglass fabric, reinforced with wood or metal, or it may be machined from wood or metal. As mentioned, the mold 10 is constructed to employ a vacuum bag molding procedure. To this end, the periphery of the mold 10 is formed with a vacuum pipe 22 that communicates through small ports or holes 24 spaced along the pipe 22 in the edge of the mold 10 with the interior of the bag when it is mounted in place so that a vacuum pump connected to the pipe 22 will evacuate the interior of the bag. FIG. 2 is a diagrammatic cross-section taken substantially in the plane 2—2 of FIG. 1 which illustrates the mold 10, the pipe 22 and a sheet of flexible material which forms the bag 26, it being understood that a resin impregnated laminate 28 is laid against the surface of the mold 10 (only a fragment 28 of the laminate is shown in solid lines to simplify the illustration) and pressed by the bag 26, when it is evacuated, against the inside surface of the mold 10.

Figure 3:
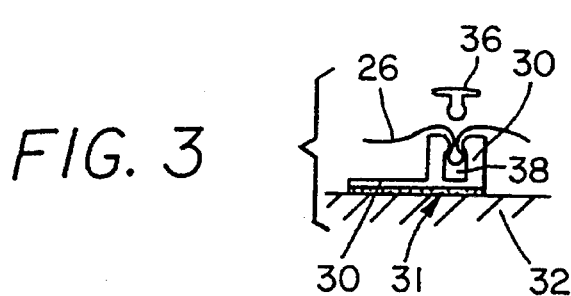
FIG. 3 is an enlarged detailed cross-sectional view of the channel member and spline of the securing device shown in FIG. 2 adhesively secured to the mold edge and securing bag material at its periphery.

In carrying out this aspect of the invention which relates to the mold improvements for the bag molding procedure, in order to secure the bag 26 in place on the mold 10 a channel member 30 is mounted around the periphery of the mold 10 outward of the vacuum holes or ports 24. The channel member may be made of extruded metal or extruded plastic such as vinyl or the like and a continuous length of such a channel member may be cut into sections to fit along the periphery of the mold, although gaps may be left between the ends of sections of the channel member, at corners of the mold for example, because the channel member may not bend sufficiently to fill such gaps. The channel member 30 is fastened preferably by adhesive 31 (FIG. 3) to the top surface of the edge 32 of the mold as shown or, if desired, the channel member 30 may be fastened to the outer surface of the mold 10, for example below the edge 32 at the location 34 and the bag material wrapped around the edge to that location 34. To seal the bag 26 at its periphery the channel member 30 presents a U-shaped exposed channel 38 and a spline 36 is inserted into the channel 38 in the channel member 30 in which it has a tight fit to hold the bag material (preferably 4 mil polyethylene sheet) in place after it has been drawn tight by the vacuum against the moldable member in the mold herein shown as the impregnated laminate 28 laid against the inside surface of the mold 10. The spline 36 which also may be of extruded material such as vinyl is inserted into the channel 38 to hold the periphery of the poly sheet and seal the bag 26. To seal the bag material between any gaps in the channel member 30 around the periphery of the mold, conventional sealing tape (not shown) may be used. The interior of the bag 26 may then be evacuated through the vacuum pipe 22 and ports 24. The spline is removable from the channel member and reusable with the same poly sheet or a new sheet so that multiple copies of the molded composites may be molded in the same mold, the channel member remaining in place.

To reduce cost and provide ready availability the channel member 30 and spline 36 may be extruded members commercially made for assembly on to window size frames for holding screen in place or for holding poly sheet in place to make a screen or storm window. Such members are F-shaped extrusions for the channel member, the back of the "F" providing a wide surface for fastening the member to the mold edge by adhesive, and T-shaped extrusions for the spline member with a thickened central leg so that it fits tightly in the channel of the channel member but is removeable so as to be reusable. They may be provided as a kit with adhesive and poly sheet material to molders, the kit comprising a length of channel member sufficient to extend around a given mold, a similar length of spline member, a sheet of plastic having an area to cover the inner surface of the mold and adequate in size to have its peripheral edge secured by the spline member to the channel member when fastened on the edge of the mold, and a tube or other dispenser of adhesive such as builders adhesive for fastening wall panels or the like.

Now turning to the method of making a molded-in hinge assembly in a section of a FRP molded composite, such as a component of an airplane wing, automobile body, or any other structure, a mold is first made such as the mold 10 for molding the FRP molded composite. While it is preferred to utilize a bag molding procedure for molding the composite, it is not essential to making a molded-in hinge assembly to use a bag molding procedure and a conventional lay-up procedure may be used. In either case, the mold 10 is prepared and for purposes of this explanation the bag 26 may be dispensed with and the mold 10 used without the bag 26, or the bag 26 may be used and the composite then can be vacuum molded.

To prepare the mold 10 for a fabric lay-up the inside surface of the mold 10 is coated with a release agent, such as wax, to allow the molded composite to be removed without damaging the mold or disturb the finished exterior surface of the molded composite. The finish coating of the molded composite is then applied to the waxed inside surface of the mold. It is highly preferred to employ a flexible finish coating, particularly in the area of the hinge line of the molded-in hinge, since this coating must flex as the hinge operates and if a non-flexible coating is used, such a coating will fracture and disturb the smooth surface of the molded composite. It is possible in applications where the hinge line is not exposed to utilize non-flexible coatings but a flexible coating is preferred.

In the making of an aircraft component such as a wing structure where it is desired to provide a strong and flexible wing, aramid fiber fabric (Kevlar) is preferably used for the outer fabric layer of the molded composite, and to provide compressive strength and reduce cost preferably one or more layers of fiberglass fabric are used for the inner fabric layer or layers of the molded composite. In other applications of the molded-in hinge of this invention where lesser tensile strengths are adequate, other fibers besides Kevlar such as polypropylene fibers may be utilized for the outer fabric layer.

Figure 4:
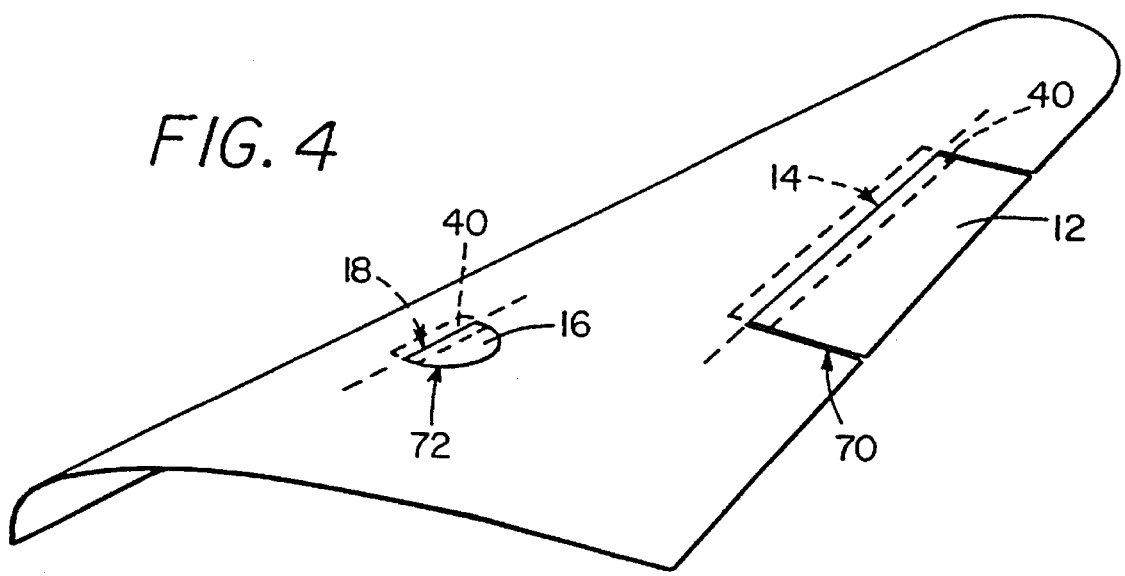
FIG. 4 is a perspective view of a molded composite such as a section of an airplane wing showing a hinged aileron and a hinged gas tank cover and a hinge assembly located along each desired hinge line.
Figure 5:
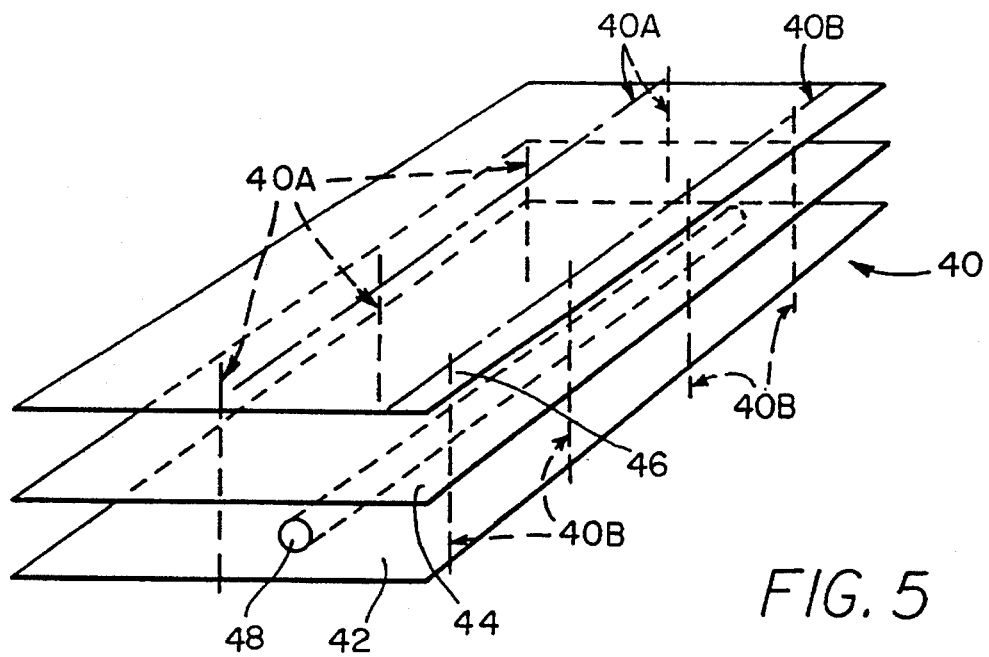
FIG. 5 is a perspective view of a three layer hinge assembly.

Accordingly, in carrying out the molded-in hinge aspect of this invention, referring to FIGS. 4 and 5, after the finish flexible coating is applied to the waxed inside surface of the mold 10 and after an outside layer of fabric 39, preferably aramid fiber fabric has been laid in place in the mold 10 and impregnated with resin, a hinge assembly 40 is placed along a predetermined desired hinge line designated 14 which could be the hinge line of an aileron 12 of a wing section or the hinge line 18 of a hinged gas tank cover 16 as illustrated in FIGS. 1 and 4.

The hinge assembly 40 is pre-assembled, preferably by stitching or otherwise fastening together along fastening lines 40A, 40B juxtaposed strips 42, 44, 46 of fiber fabric, as illustrated in FIG. 5. An elongated member such as a piece of piano wire 48 is placed between two of the fabric strips, the length of the wire being equal to the full length of the desired hinge line and the fabric strips 42, 44, 46 and wire 48 are held assembled by the stitching along the lines 40A, 40B.

When the hinge line assembly 40 has been placed on the layer of impregnated fabric 39 previously laid-up on the inside of the mold 10, the assembly 40 is placed such that the wire 48 lies along the hinge line 14, 18 in the final structure.

The wire 48 is preferably located between the strip 42 of fabric which will be innermost or near the back in the molded composite and the adjacent strip 44 of fabric in the hinge assembly 40. After the hinge assembly 40 is placed in position in the mold 10, the assembly 40 is impregnated with resin which, being wet, holds the assembly 40 in position until the resin sets.

In the preferred embodiment, the strip 46 of hinge assembly fabric which will be outer-most in the molded composite is preferably a woven fabric of aramid fibers. For the application of a hinge in an aircraft wing structure, the weight of the fabric preferably used is 9 ounces/square yard, the same weight of fabric used in the aircraft skin structure.

One application of the hinge structure in an aircraft is for the canopy of the cockpit of a small plane and, in this embodiment, the hinge assembly preferably comprises two aramid cloth or fabric layers of 9 ounces/square yard and a third layer of fiberglass cloth or fabric with a weight of 22 ounces/square yard. The wire preferably used is conventional piano wire and in a canopy application was approximately 27 inches in length and 3/32 inch in diameter.

The resin used for the aircraft skin structure and for impregnating the hinge assembly when in place is preferably epoxy resin.

In making such a three layer hinge assembly 40, the two aramid cloth or fabric layers 44, 46 are preferably oriented on the bias relative to the wire 48 and are preferably stitched to the fiberglass cloth or fabric by lengths of fiberglass roving or yarn using two rows 40A, 40B of stitches arranged parallel and as close as practical to the wire 48, i.e., within about 1 inch. Additional rows of stitching are desirably placed spaced another inch or so outward of the original two rows 40A, 40B. The overall width of the hinge assembly in the exemplary embodiment is about 5 inches.

After the hinge assembly 40 has been placed in position on the impregnated outside fabric layer 39 which is against the mold surface and before the resin impregnating the entire composite has set, it may be desired to apply an additional fabric layer 50 to further integrate the hinge assembly into the composite. After the lay-up is complete, the resin of the multiple layer composite, including the hinge assembly is allowed to set. Preferably this is carried out, as previously explained, using a bag molding procedure in which the multiple layer composite is pressed against the mold surface. As a preferred example of how that can be achieved, and as previously explained, a mold 10 for a contoured wing section of an aircraft is constructed with a manifold made of sections of perforated 1 inch pipe 22 arranged around the periphery of the mold 10, as illustrated in FIG. 1. The inside of the mold 10 and laid-up multiple layer composite is then covered by a plastic bag 26 secured around its periphery by the fastening devices comprising the channel member 30 and spline 36 as previously described, thus providing a sealed bag. The manifold 22 is connected to a vacuum source and the bag 26 evaporated to press the bag 26 against the multiple layer composite and the inside of the mold 10. In this step of the process, a benefit is obtained by applying pressure against the hinge assembly 40, specifically against the wire 48, in a direction normal to the surface of the mold 10 to pinch or squeeze resin from between the layers of fabric 44, 46, 39 in areas outward and inward of the wire 48. The resin is squeezed from between the wire and the layers of fabric and forced laterally. This effectively reduces the amount of resin remaining in these areas when the resin has set. The composite is pressed against the mold 10 until the resin sets. The bag 26 is then removed and the molded composite removed from the mold 10 and the resin allowed to cure.

Figure 6:
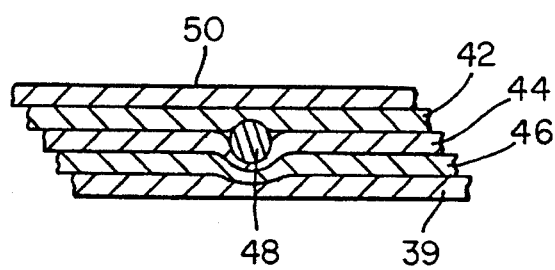
FIG. 6 is an enlarged fragmentary sectional view through a molded composite at the hinge line.
Figure 7:
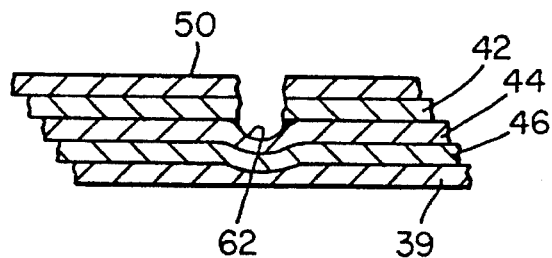
FIG. 7 is a view similar to FIG. 6 after a slot has been formed on the inside or back of the composite and the hinge assembly wire has been removed through the slot.

After the molded composite has been removed from the mold and the resin has set and preferably before the resin has cured, referring to FIGS. 6 and 7, operations are carried out on the hinge assembly 40 to complete the hinge by first removing sufficient resin and impregnated fabric from the inner surface or back of the molded composite to form a slot 60 the length of the wire 48, through which the wire 48 is removed from the molded composite. For example, a powered cutting or grinding wheel or hand file may be used to file away and thereby remove the single impregnated fiberglass cloth layer 42 of the hinge assembly 40 on the back of the composite adjacent the wire 48 and any superposed fabric layer 50 to form the slot 60, the wire then being removed laterally through the slot 60. The multiple layers of aramid fiber fabric 39, 46 on the outside of the composite are left shaped to the contour of the wire on the inside and to the contour of the mold surface on the outside. In other words, the outside surface of the molded composite is not disturbed by the presence of the groove 62 on the back of the molded composite left by the impression of the wire 48 and the cut slot 60 after removal of the wire 48. This is an important feature of the invention, that the molded-in hinge does not disturb the exterior surface of the molded composite. This is important aesthetically, and is extremely important in an application such as an airplane wing since the hinge does not introduce any surface irregularities or interrupt the surface smoothness and thus does not disturb the smooth airfoil surface on the wing.

With a molded composite made of five layers, three of aramid fiber and two of fiberglass, the structure after the wire is removed is illustrated schematically in FIG. 7.

While not necessary, it is preferred to have the aramid fabric layer 46 arranged on the bias relative to the wire 48. The fabric being made of yarns of aramid fibers in the preferred example, these fibers are arranged on the bias or at approximately 45 degrees relative to the hinge groove 62 left after removal of the wire. It is these fibers which extend across the hinge line that allow the opposite edges of the sections abutting the groove 62 to pivot with respect to each other, the fibers being flexible and there being only a small amount of resin bonding the fibers adjacent the hinge axis, which is the axis of the groove 62 left after removal of the wire 48.

After the wire 48 has been removed from the slot 60, the section of the molded composite which is to pivot is then separated as by cutting from the remaining section of the molded composite. For example, in the case of the aileron 12 in FIGS. 1 and 4, the aileron is then cut from the wing along the boundary 70 which intersects the hinge line 14 at two spaced points defining the opposite ends of the aileron 12 and which lie substantially at the end of the groove 62 left in the structure from the impression of the removed wire 48. Similarly, in the case of the hinged gas tank cover 16, the composite is cut along the curved outline or boundary 72 of the cover 16 intersecting the hinge line 18 at two spaced points defining the opposite ends of the cover 16, so that the cover 16 is formed by a flap which is pivotally supported by the hinge fibers which extend across the hinge line 18.

Figure 8:
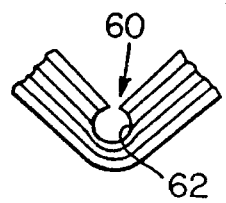
FIG. 8 is a view similar to FIG. 7 showing the hinged sections pivoted toward each other.

Conventional epoxy resin systems cannot get a good bond on aramid fibers so that when the adjacent sections are moved back and forth the remaining resin along the hinge line fractures and is caused to separate from the aramid fibers as they flex and as the hinge is operated. A limited amount of pivotal movement is allowed in the hinge structure which is illustrated in FIG. 7, since the parts can only pivot inward until the open mouth of the groove 62 is closed, as shown in FIG. 8. The parts may flex in the outward direction to an extent limited only by the flexibility of the fibers.

Figure 9:
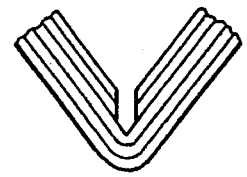
FIG. 9 is a view similar to FIG. 8 of a composite in which the hinge assembly included a triangular wire and the mouth of the slot was widened to allow increased range of pivotal movement.

To increase the amount of pivotal movement allowed in the inward direction by the hinge structure, the mouth of the groove 62 may be widened mechanically, as by filing or other cutting procedures, or the wire may have a different shape, such as a triangular shape with an apex arranged toward the outside of the composite structure, shown in FIG. 9. When a hinge assembly having such a triangular wire is used in the making of the composite, the back of the composite is cut or filed along the wire so that the triangular wire may be removed.

In the foregoing exemplary embodiment, one layer of the hinge assembly is made of fiberglass cloth, glass fibers contributing strength in compression to the completed hinge. The other fabric layers are made of aramid fibers which have great strength in tension, contributing tensile strength in the completed hinge, these being the fibers that are flexed as the hinged sections are pivoted with respect to each other. Aramid fibers are also very flexible and fatigue does not occur upon repeated flexing of the hinge construction.

While in the foregoing exemplary embodiment Kevlar fabric of aramid fibers has been used, other fibers may be used, such as polypropylene fibers in a cloth or web, in making the hinge assembly. Polypropylene fibers, like aramid fibers, have high tensile strength and do not experience fatigue upon repeated flexing. The choice of fibers is thus dependent on the application intended for the completed composite structure including the molded-in hinge. This invention is not to be limited to any particular material. It has been found particularly well adapted for use in the molding of fiberglass fabric or cloth and aramid fiber fabric or cloth with epoxy resins, although other plastics, such as phenolics, polyesters, and melamines, may well be used in certain applications. Furthermore, any material suited for laminating or laying up with such plastics may be substituted for the fiberglass and aramid fiber fabric or cloth, with a possible lessening of structural strength which would attend such substitution of materials.

It is to be noted that the hinge structure has rigidity since it is composed of multiple resin-impregnated webs of fibers stitched together. However, in applications where the hinge, in use, is subjected to high external force tending to twist or bend the hinge along the hinge axis, the parts should be reinforced structurally, as by girders of metal or plastic. For example, in a hinged aircraft canopy construction, the panel containing the hinge is preferably secured with adhesive to a longitudinal member of the aircraft frame which is located parallel to and adjacent the hinge. Where the hinge structure is used for an aileron as on a wing (see FIG. 4) or rudder structure of an aircraft, the internal framework of the wing or rudder usually provides the requisite strength and rigidity to maintain the hinge axis such that the parts may pivot as required.

The preassembled hinge assembly 40 includes multiple rows of stitches of yarn or roving of aramid or glass fibers. These rows of stitches provide the assembly with integrity to allow it to be properly placed in position during the lay-up procedure. In addition, the rows of stitching allow the assembly to be placed into position without forming wrinkles and also lend additional fiber reinforcement to the completed hinge structure to resist delamination of the layers of fiber fabric when the hinge assembly is subjected to high delamination stresses in use.

Figure 10:
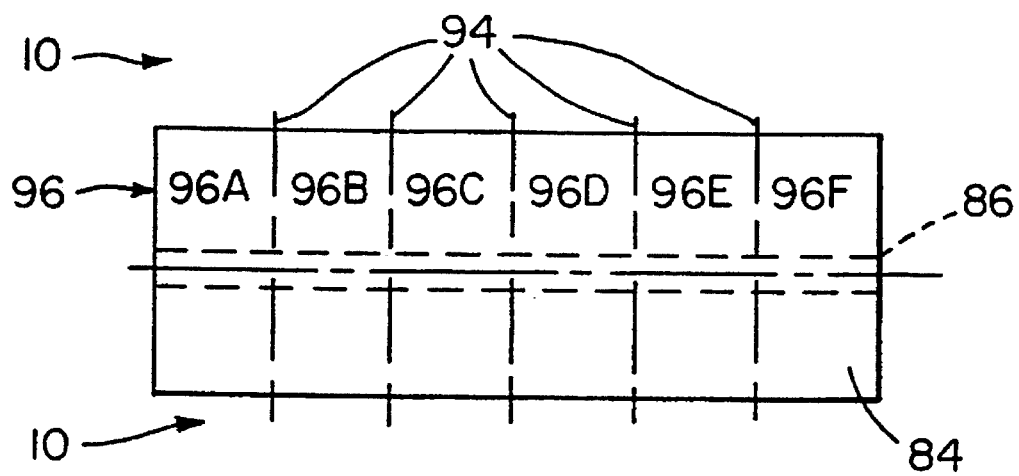
FIG. 10 is a diagrammatic plan view of a continuous molded-in hinge which can be cut into individual hinges which are pre-formed components for subsequent assembly into products.
Figure 11:
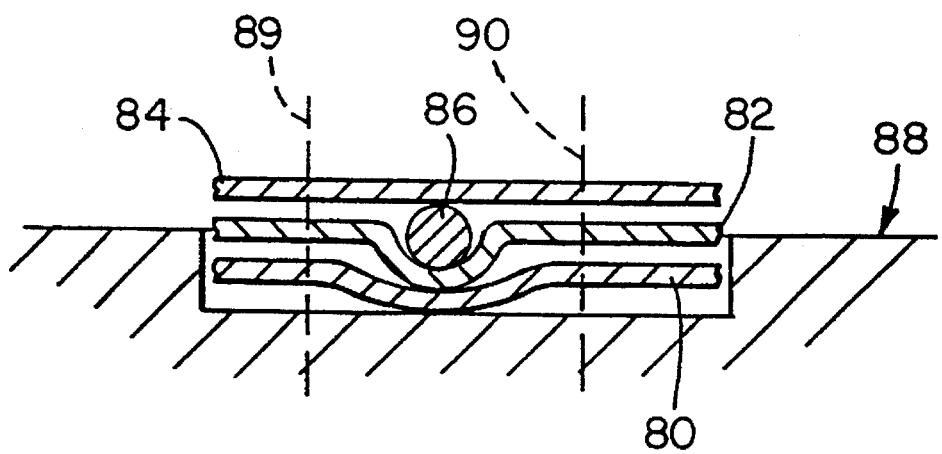
FIG. 11 is a diagrammatic sectional view of the multiple layer hinge structure shown in FIG. 10 in a mold.
Figure 12:
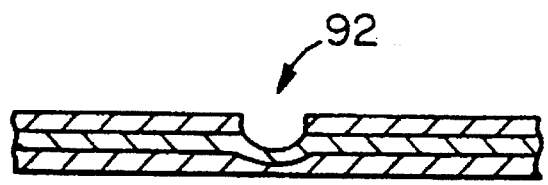
FIG. 12 is a diagrammatic sectional view similar to FIG. 11 after a slot has been made and the wire removed from the structure of FIGS. 10 and 11.

Now referring to FIGS. 10–12 a pre-formed FRP composite hinge is shown which may be subsequently assembled into a product in place of a conventional metal or plastic hinge. In FIG. 10 a plan view is shown of the multiple layer composite which as shown in FIG. 11 includes, in this example, three layers 80, 82, 84 of fabric. A wire 86 is placed between two of the layers 80, 82. To mold this multiple layer arrangement of fabric 80, 82, 84 into a hinge, it is placed on a mold surface 88 with the wire 86 in position. The multiple layer arrangement may be pre-assembled and fastened together with stitching along fastening lines 88, 90 parallel to the wire 86 and/or may be laid in a shallow trough defined in the flat surface 88 of the mold.

With the multiple layer arrangement in position in the mold or on a totally flat surface, the layers of fabric are impregnated with resin. The resin is allowed to set. After the resin has set, a slot 92 is formed, as shown in FIG. 12, adjacent the wire 86 and open to one surface such as the back of the arrangement. The wire 86 is removed through the slot 92 leaving a groove defining the hinge axis. As shown in FIG. 10 a continuous fabric hinge 96 may be made or the multiple layer strip may be cut along the exemplary dividing lines 94 into narrower individual hinges 96 A-F.

It is preferred to use aramid fiber fabric, oriented on the bias relative to the hinge line defined by the wire 86, for the fabric layers 80, 82, and glass fiber fabric for the fabric layer 84, providing flexible fibers extending across the hinge line which have high tensile strength and are capable of repeated flexings without fatigue, and high compression strength fibers on the back side of the hinge. While three layers are preferred, as shown, two layers may be sufficient in some applications, one fiber hinge fabric layer and one reinforcing fiber fabric layer 84. As mentioned above it may be desired to incorporate or embed stiffening members between the layers of the hinge fabrics to resist twisting or add structural rigidity. While epoxy resin is preferred for the resin system, other resins may be used with other combinations of fibers in the fabrics used for the multiple layers, depending on the strength and cost requirements for the finished product, as previously explained.

I claim:

1. A fiber reinforced plastic (FRP) molded composite hinge comprising:

a fiber fabric impregnated with resin;

a hinge assembly secured by resin to the impregnated fiber fabric to form the FRP molded composite, the FRP molded composite having an inner surface adjacent the impregnated fiber fabric;

said hinge assembly comprising:

juxtaposed narrow strips of fabric impregnated with resin including (1) at least one strip of hinge fiber fabric comprised of flexible fibers which are of high tensile strength and capable of repeated flexing without substantial fatigue and which are arranged to form flexible elements extending across a hinge line in the FRP molded composite, and (2) at least one strip of reinforcing fiber fabric comprised of fibers which form reinforcing elements in the FRP molded composite adjacent the hinge line; and a groove co-extensive with the hinge line in the FRP molded composite extending from the inner surface of the FRP molded composite through the reinforcing fiber fabric to the hinge fiber fabric;

the groove separating two sections hinged relative to each other by the hinge fiber fabric which joins the two sections adjacent the hinge line and which has fibers that extend across the hinge line and flex to provide a molded-in hinge.

2. A fiber reinforced plastic (FRP) molded composite hinge comprising:

juxtaposed layers of resin-impregnated fabric including (1) at least one layer of hinge fiber fabric comprised of flexible fibers which are of high tensile strength and capable of repeated flexing without substantial fatigue and which are arranged to extend across a hinge line in the FRP molded composite, (2) at least one layer of reinforcing fiber fabric comprised of fibers which form reinforcing elements in the FRP molded composite adjacent the hinge line, and (3) a straight groove extending from a surface of the hinge fiber fabric to an exposed inner surface of reinforcing fiber fabric, the groove being co-extensive with the hinge line in the FRP molded composite;

the FRP molded composite having an exterior surface formed to the shape of a mold surface on an opposite side of the FRP molded composite to the exposed inner surface of reinforcing fiber fabric;

the groove in the FRP molded composite along the hinge line separating two sections hinged relative to each other by the hinge fiber fabric which joins the two sections adjacent the hinge line and has fibers that extend across the hinge line and flex to provide a molded-in hinge.

3. An integral fiber hinge according to claim 2 further including a resin-impregnated layer of fiber fabric adjacent the hinge fiber fabric, wherein the juxtaposed layers of resin-impregnated fabric are comprised of narrow, elongated strips of fabric, the groove is arranged lengthwise of the strips of fabric, and wherein the strips of fabric and resin-impregnated layer of fiber fabric form a multiple layer FRP molded composite.

4. An integral fiber hinge according to claim 2 wherein a first pair of edges of the FRP molded composite extend along boundary lines lying generally in the same direction as the hinge line, and a second pair of edges lie generally transversely to the hinge line, providing a pre-formed hinge.

5. An integral fiber hinge according to claim 4 wherein the FRP molded composite is divided along a plurality of boundary lines extending generally transversely to the hinge line, providing a plurality of pre-formed hinges.

* * * * *